US007653928B2

(12) United States Patent
Almstrand et al.

(10) Patent No.: US 7,653,928 B2
(45) Date of Patent: Jan. 26, 2010

(54) REMOTE USER INTERFACE FOR MEDIA PLAYER

(75) Inventors: Cristian Lars Almstrand, San Diego, CA (US); Prem Aanand Venkatesan, San Diego, CA (US); Hiroyuki Shinkai, Kawasaki (JP); Hirokazu Imazeki, Yokohama (JP); Masahiko Seki, Matsudo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1542 days.

(21) Appl. No.: 10/289,482

(22) Filed: Nov. 6, 2002

(65) Prior Publication Data

US 2004/0064518 A1 Apr. 1, 2004

Related U.S. Application Data

(60) Provisional application No. 60/407,174, filed on Aug. 30, 2002.

(51) Int. Cl.
*H04N 7/173* (2006.01)

(52) U.S. Cl. ............................ 725/87; 725/88; 725/89; 725/109; 725/110; 725/112; 709/219

(58) Field of Classification Search .................. 725/86, 725/87–89, 109–112, 39, 44, 47, 53, 135–153; 709/219

See application file for complete search history.

(56) References Cited

U.S. PATENT DOCUMENTS

| | | | | | |
|---|---|---|---|---|---|
| 4,829,558 | A | * | 5/1989 | Welsh | 379/92.04 |
| 5,200,825 | A | * | 4/1993 | Perine | 348/722 |
| 5,317,391 | A | * | 5/1994 | Banker et al. | 725/139 |
| 5,616,876 | A | | 4/1997 | Cluts | 84/609 |
| 5,812,928 | A | * | 9/1998 | Watson et al. | 725/118 |
| 5,907,322 | A | * | 5/1999 | Kelly et al. | 725/51 |
| 6,085,232 | A | * | 7/2000 | Kikinis | 709/206 |
| 6,104,334 | A | * | 8/2000 | Allport | 341/175 |
| 6,151,634 | A | | 11/2000 | Glaser et al. | 709/236 |
| 6,182,126 | B1 | | 1/2001 | Nathan et al. | 709/219 |
| 6,248,946 | B1 | | 6/2001 | Dwek | 84/609 |
| 6,493,796 | B1 | * | 12/2002 | Arnon et al. | 711/114 |
| 6,687,793 | B1 | * | 2/2004 | Thomas et al. | 711/133 |
| 6,744,780 | B1 | * | 6/2004 | Gu et al. | 370/450 |
| 6,982,953 | B1 | * | 1/2006 | Swales | 370/218 |
| 2002/0002039 | A1 | * | 1/2002 | Qureshey et al. | 455/344 |

(Continued)

FOREIGN PATENT DOCUMENTS

| | | |
|---|---|---|
| EP | 1220215 | 7/2002 |

(Continued)

*Primary Examiner*—John W Miller
*Assistant Examiner*—Sumaiya A Chowdhury
(74) *Attorney, Agent, or Firm*—John L. Rogitz

(57) ABSTRACT

A portable media player communicates with a host computer for enabling a user of the player to manage media distribution using the control software of the host computer. The host computer can send a GUI that is displayed on the otherwise "dumb" player, and the user can view the GUI and press a single button to command the control software to download a media title to the player. The host computer can periodically poll the player to determine its status.

8 Claims, 3 Drawing Sheets

OVERALL CONTROL LOGIC

U.S. PATENT DOCUMENTS

| | | | | |
|---|---|---|---|---|
| 2002/0035595 | A1 | 3/2002 | Yen et al. | 709/203 |
| 2002/0038376 | A1 | 3/2002 | Halliday | 709/231 |
| 2002/0116082 | A1 | 8/2002 | Gudorf | 700/94 |
| 2005/0015163 | A1 * | 1/2005 | Lapstun et al. | 700/94 |

FOREIGN PATENT DOCUMENTS

| | | |
|---|---|---|
| GB | 2 325 547 | 11/1998 |
| JP | 04003566 | 1/1992 |

* cited by examiner

SYSTEM

OVERALL CONTROL LOGIC

REMOTE USER INTERFACE FOR MEDIA PLAYER

RELATED APPLICATIONS

This application claims priority from U.S. provisional application Ser. No. 60/407,174, filed Aug. 30, 2002, incorporated herein by reference.

FIELD OF THE INVENTION

The present invention relates generally to media player systems.

BACKGROUND

Media players such as digital music players and multimedia players have been introduced. Some of these players permit a user to transfer media, under control of a host computer operated by a user, between the player and the host computer, which might be networked. In this way, media titles that are available on the network can be conveniently transferred to the media player.

To manage the above-mentioned operations, control software is executed on the host computer. The control software is operated by a user at the host computer to present a graphical user interface (GUI) on the host computer, to facilitate, e.g., browsing for media titles and controlling the transfer of titles to the player.

As recognized by the present invention, the process discussed above requires a user to access the host computer, and to know how to operate the host computer. As further recognized by the present invention, it would be advantageous to permit the user to manage media transfer using the player itself, without requiring the player to have a relatively expensive processor capable of executing the operating software.

SUMMARY OF THE INVENTION

A system for managing media distribution includes a host computer and a media player that includes a display and at least one input device. The media player communicates with the host computer. A software-implemented control module in the host computer renders a user interface (UI) on the player, such that a user can manipulate the input device in cooperation with the UI to manage distribution of media between the host computer and player.

In a preferred embodiment, the user can manipulate the input device to cause the host computer to transfer a media stream to the player. The preferred input device may include one or more buttons on the player and, if desired, a jog dial, and a media stream can be downloaded to the player in response to the user depressing the button once and only once, without requiring the user to depress any other buttons. Also, the preferred player may include at least one light emitting diode (LED) and the host computer can energize the LED to indicate to the user the availability of a music title.

In other preferred, non-limiting embodiments, the host computer can periodically poll the player to determine player status. Preferably, the host computer polls the player more frequently when the player is in an active mode than when the player is in an energy-saving mode. The player may not be able to initiate communication with the host computer.

In another aspect, a method for providing at least one media stream to a media player includes engaging a data storage disk with a medium device to establish an engagement, and detecting the engagement. Using the host computer, an indication of the engagement is caused to be displayed on the media player. The method also includes manipulating a single button a single time on the media player to cause a media stream on the disk to be sent to the media player under control of the host computer.

In still another aspect, a media player includes electronic media storing at least one media stream, and means for playing the stream. A display for presenting a user interface (UI) generated by a host computer and transmitted from the host computer to the media player is also provided.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
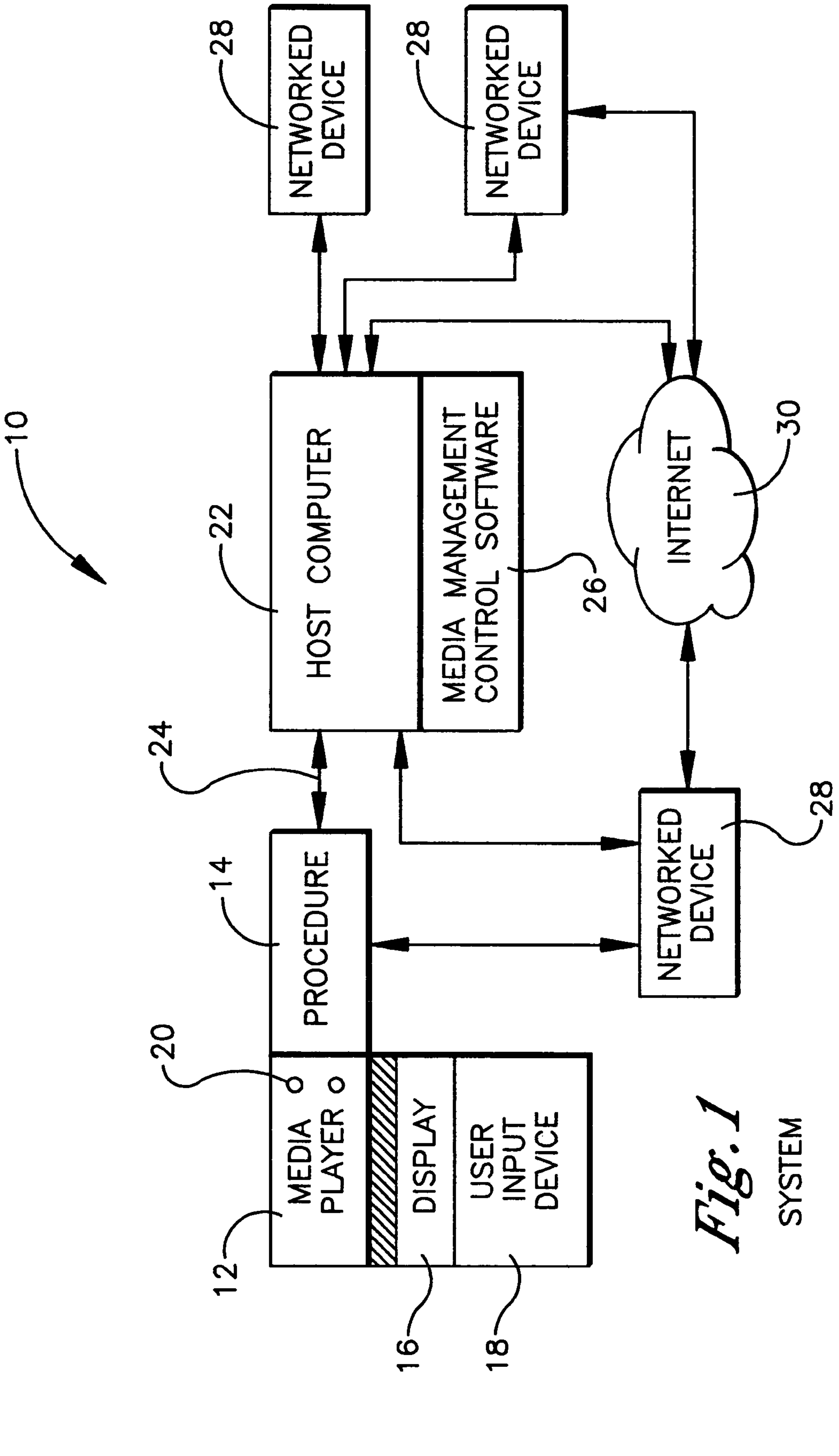
FIG. 1 is a block diagram of a system of the present invention.

Referring initially to FIG. 1, a system is shown, generally designated 10, that includes a portable media player 12, such as a music player, e.g., a Sony Walkman® or other multimedia player with data storage capabilities, such as a Sony Memory Stick®, for storing digitally recorded songs and the like. The media player 12 also includes a play device that reads electronically stored streams on the data storage and transforms the streams into audible sounds in accordance with media stream playing principles known in the art, such as those embodied in a Sony Walkman®. The media player 12 can be a CD player.

The media player 12 can include a processor 14 and a display 16, such as an LCD display, but unlike a personal computer, the processor 14 does not generate a graphics user interface (GUI) on the display 16 when undertaking the media management operations discussed below. By "GUI" or "UI" is meant the actual graphical elements necessary for control using a display, as opposed to data elements, such as media titles, that are displayed using an underlying GUI. In a less preferred embodiment, no display need be provided, only the below-described LEDs to indicate status.

The media player 12 can also include a user input device 18, such as but not limited to buttons and/or jog dials. In one preferred non-limiting embodiment, the media player 12 includes a housing that can be worn on the belt of a person and headphones connected by a wire to the housing, with the display 16 and input device 18 (in the form of buttons and jog dial) being attached to the headphone wire, although all the components of the player 12 can be mounted on a single housing if desired. If desired, non-graphic indicators such as LEDs 20 (three shown) can be provided on the belt-worn portion of the player 12 for purposes to be shortly disclosed.

As shown in FIG. 1, the system 10 includes a host computer 22 that communicates with the media player 12 via a communication path 24. The path 24 can be a wire that uses a universal serial bus (USB) protocol, or a IEEE 1394 protocol, or a RS-232 protocol, or a 802.11 protocol. Or, the path 24 can be a short range wireless path such as Bluetooth, infrared, or other wireless path. The host computer 22 can be a personal computer or other computer associated with the user that executes a media management control module 26 in accordance with the logic below.

FIG. 1 also shows that one or more networked devices 28 can be connected to the host computer 22 either directly or through the Internet 20. If desired, a networked device 28 can be connected directly to the player 12. The networked devices 28 can be, without limitation, CD and DVD players that can receive, e.g., CD-ROMs on which music or other sound is recorded, and other computers. One of the networked devices 28 may be an Internet-accessible or otherwise accessible electronic music distribution server.

Figure 2:
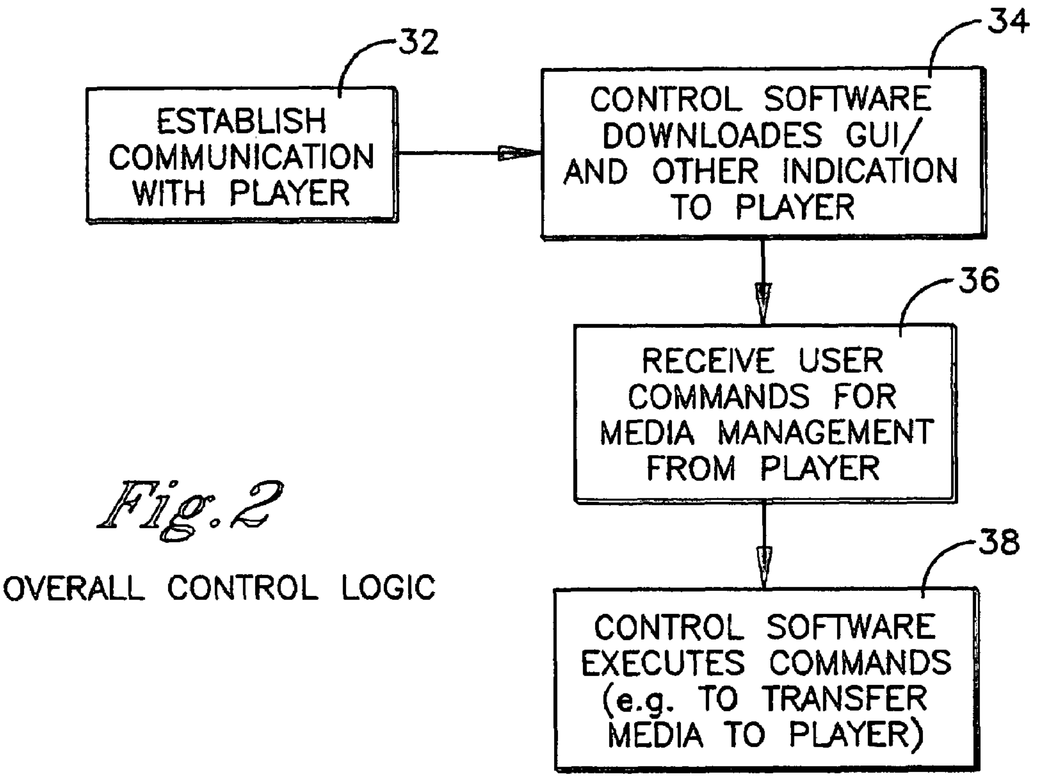
FIG. 2 is a flow chart of the overall logic.

Now referring to FIG. 2, the overall logic of the present invention can be seen. Commencing at block 32, communication is established between the host computer 22 and the player 12. In some embodiments the player 12 cannot initiate communication, so that the host computer 22 initiates the link at block 32.

Moving to block 34, the control software 26 in the host computer 22 downloads a GUI to the player 12 for display thereof on the display 16. The GUI can, without limitation, indicate and support operations that may be executed by the host computer 22 in response to user input at the player 12, as well as provide the necessary control means that enable the user to issue commands to cause the host computer 22 to execute the operations.

In any case, the processor 14 of the player 12 need not generate the GUI or even know how it functions. This makes the player 12 very robust, in that additional functionality can be provided simply by appropriately programming the host computer 22 without having to modify the relatively simple and inexpensive player 12.

At block 36, user commands generated by appropriately manipulating the input device 18 on the player 12 in conjunction with the GUI are received by the host computer 22. These commands represent user management desires, e.g., a command to copy a stream from one of the devices on the network, such as all or part of the content of a CD player network device 28, to another, such as the player 12. The commands can also indicate updating the player display to allow the user to navigate through the menus. The commands from the player 12 are executed by the host computer 22 at block 38.

Figure 3:
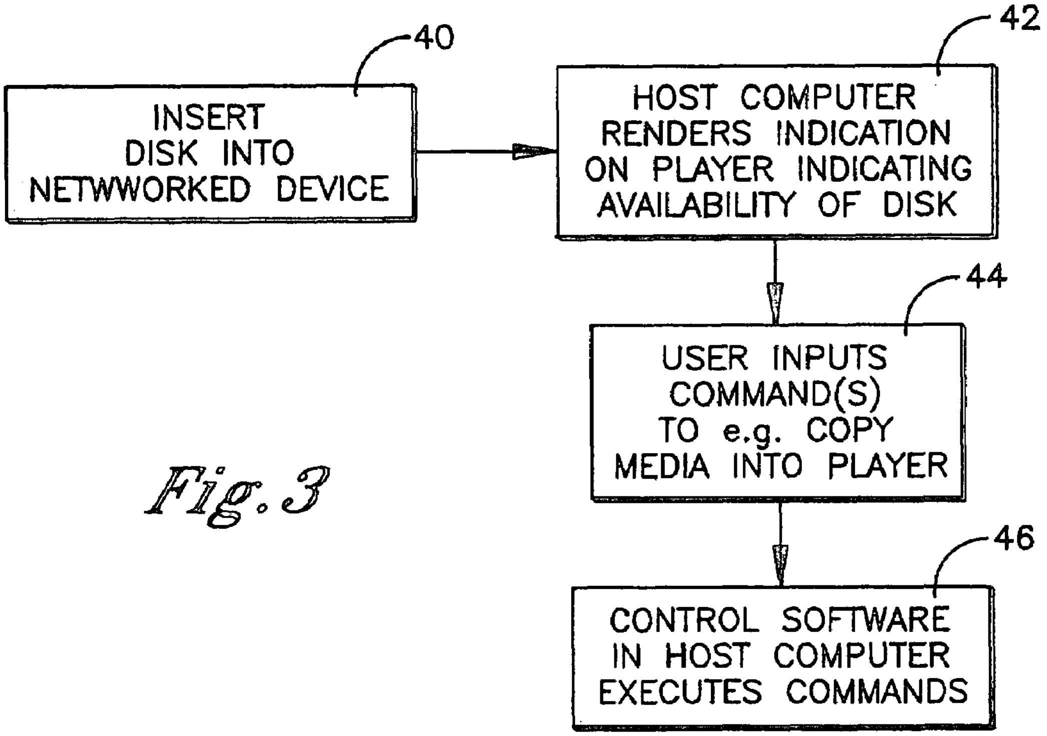
FIG. 3 is a flow chart of exemplary non-limiting logic for managing media operations using the player, under control of software in the host computer.

FIG. 3 shows an exemplary one-click copy operation in accordance with the present invention. Commencing at block 40, a user can engage a disk such as a CD or DVD with an appropriately configured network device 28. The host computer 22 detects the engagement by, e.g., receiving a message indicative of the engagement from the network device 28.

At block 42, the host computer renders an indication on the player 12 that the disk has been engaged with the network device 28 and that digitally recorded streams, such as music or multimedia streams, are available for recording into the player 12. A menu showing the available artists, and/or albums, and/or tracks, can be displayed. Without limitation, the indication can include one or more of the following: energizing the LED 20, displaying the titles of available streams on the display 16, and displaying a message on the display such as "copy disk?"

Moving to block 44, the user manipulates the input device 18 as appropriate to input the desired command(s). In one preferred embodiment, the input device 18 includes a button, and the user simply depresses the button once and only once to cause the host processor to provide the player 12 with a copy of the available stream or streams—i.e., one-click copying. No other user action is required, either at the player 12, host computer 22, or network device 28. Instead, at block 46 the control software of the host computer 22, responsive to the command input at the player 12, executes the command, in this case, by causing a copy of the available stream on the disk that was engaged at block 40 to be sent to the player 12.

In another embodiment, the user of the player 12 may scroll through a list of titles presented on the GUI using the jog dial of the input device 18. When the desired title is displayed, the user may depress a button of the input device 18 to receive a copy of the stream represented by the title. Still further, the GUI generated by the host processor 22 may display a list of available artists, with the user selecting one of the artists to cause a second menu or list of songs by that artist to appear on the display 16 of the player 12, for subsequent selection of a particular song or songs by that artist.

Figure 4:
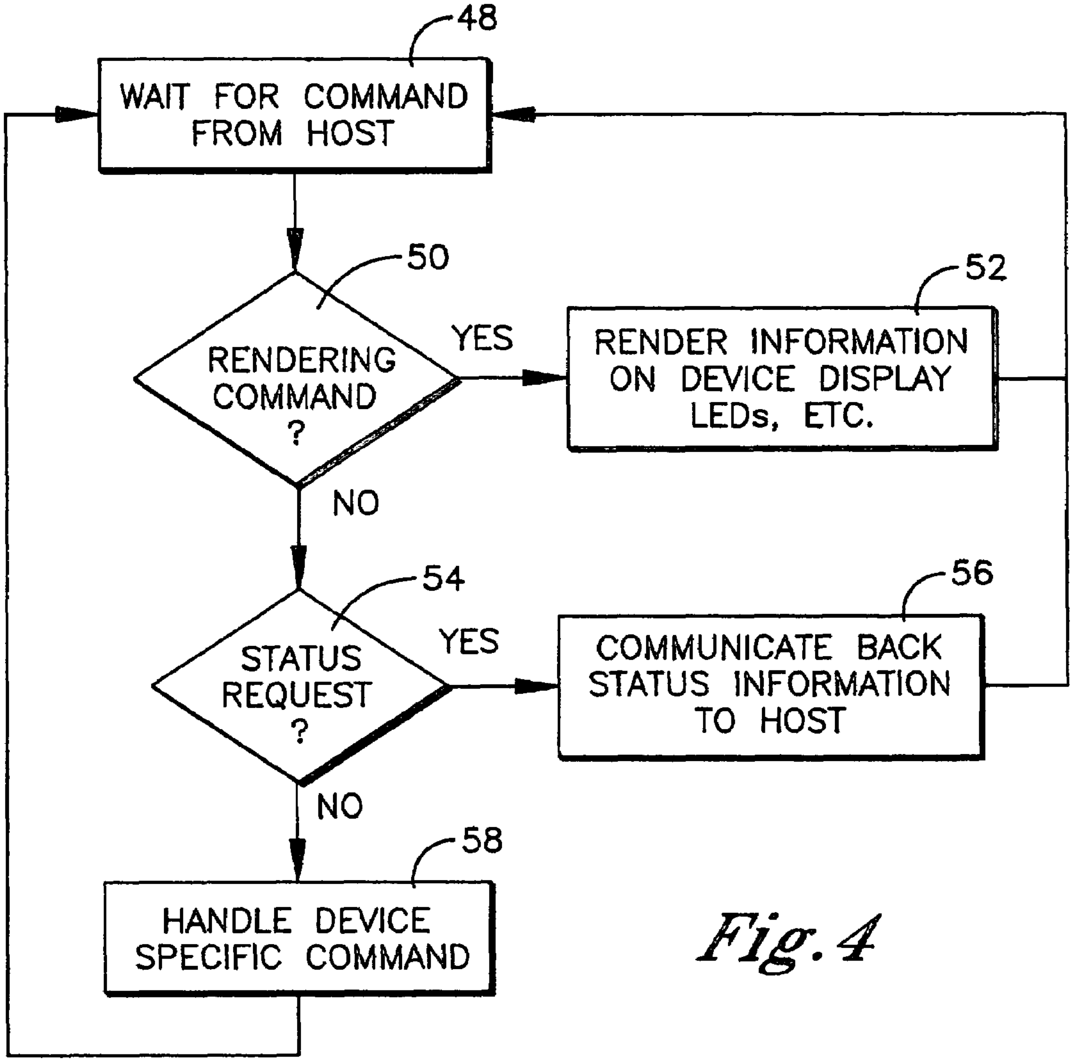
FIG. 4 is a flow chart of exemplary non-limiting logic that can be followed to manage media using a player that receives periodic status requests from the host processor.

FIG. 4 shows logic that can be executed to copy content to the player 12. While the logic is shown in flow chart form with decision diamonds for convenience of disclosure, it is to be understood that the logic equivalently could be represented by a state diagram or other logic indicating convention.

Commencing at block 48, a command from the host computer 22 is monitored for. Decision diamond 50 indicates that the command, when received, might be a command to render the GUI on the display 16 or energize an LED, in which case the logic moves to block 52 to render the GUI and/or energize the LED. Decision diamond 54, on the other hand, indicates that the command may be a status request, in which case the logic moves to block 56 to communicate the status of the player 12 back to the host computer 22. In one preferred non-limiting embodiment, to conserve energy the player 12 has an energy saving mode and an active mode. In the energy saving mode, the player 12 is quiescent, to conserve energy. When this status is reported to the host computer 22, it issues status checks to the player 12 less frequently than it does when the player 12 is in the active mode, i.e., is being used to play a media stream. The user may exit the energy saving mode at any time by, e.g., depressing a button on the input device 18.

Block 58 indicates that if the processor 14 determines that a command has been received but that it is not from the host computer 22, it must be a device-specific command (such as "play track") that is executed locally.

While the particular REMOTE USER INTERFACE FOR MEDIA PLAYER as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

What is claimed is:

1. A system for managing media distribution, comprising:

at least one host computer;

at least one media player including a display and at least one input device, the media player communicating with the host computer; and at least one software-implemented control module in the host computer and rendering a user interface (UI) on the player, wherein a user can manipulate the input device in cooperation with the UI to manage distribution and/or playback of media between the host computer and player, wherein the host computer periodically polls the player to determine player status, wherein the host computer polls the player more frequently when the player is in an active mode than when the player is in an energy-saving mode.

2. A method for providing at least one media stream to a media player, comprising:

engaging a data storage disk with a medium device to establish an engagement, the storage disk containing the media stream;

detecting the engagement using a host computer separate from the medium device and communicating therewith, the host computer causing an indication of the engagement to be displayed on the media player; and manipulating a single button a single time on the media player to cause the media stream to be sent to the media player under control of the host computer.

3. The method of claim 2, wherein the indication is established by energizing at least one LED.

4. The method of claim 2, further comprising causing the media player to display a GUI generated by the host computer.

5. The method of claim 4, wherein the GUI indicates the title of the stream in human readable form.

6. The method of claim 2, wherein the media player cannot initiate communication with the host computer.

7. The method of claim 2, comprising periodically polling the player using the host computer to determine player status.

8. The method of claim 7, comprising polling the player more frequently when the player is in an active mode than when the player is in an energy-saving mode.

* * * * *

UNITED STATES PATENT AND TRADEMARK OFFICE

CERTIFICATE OF CORRECTION

PATENT NO. : 7,653,928 B2
APPLICATION NO. : 10/289482
DATED : January 26, 2010
INVENTOR(S) : Almstrand et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1441 days.

Signed and Sealed this

Twenty-third Day of November, 2010

David J. Kappos

David J. Kappos
*Director of the United States Patent and Trademark Office*